INVENTORS
ROBERT V. MATHERS
PAUL N. SASS
ATTORNEYS

March 30, 1965
R. V. MATHERS ETAL
3,175,706
HYDRAULIC TAIL GATE
Filed Feb. 2, 1962
3 Sheets-Sheet 2
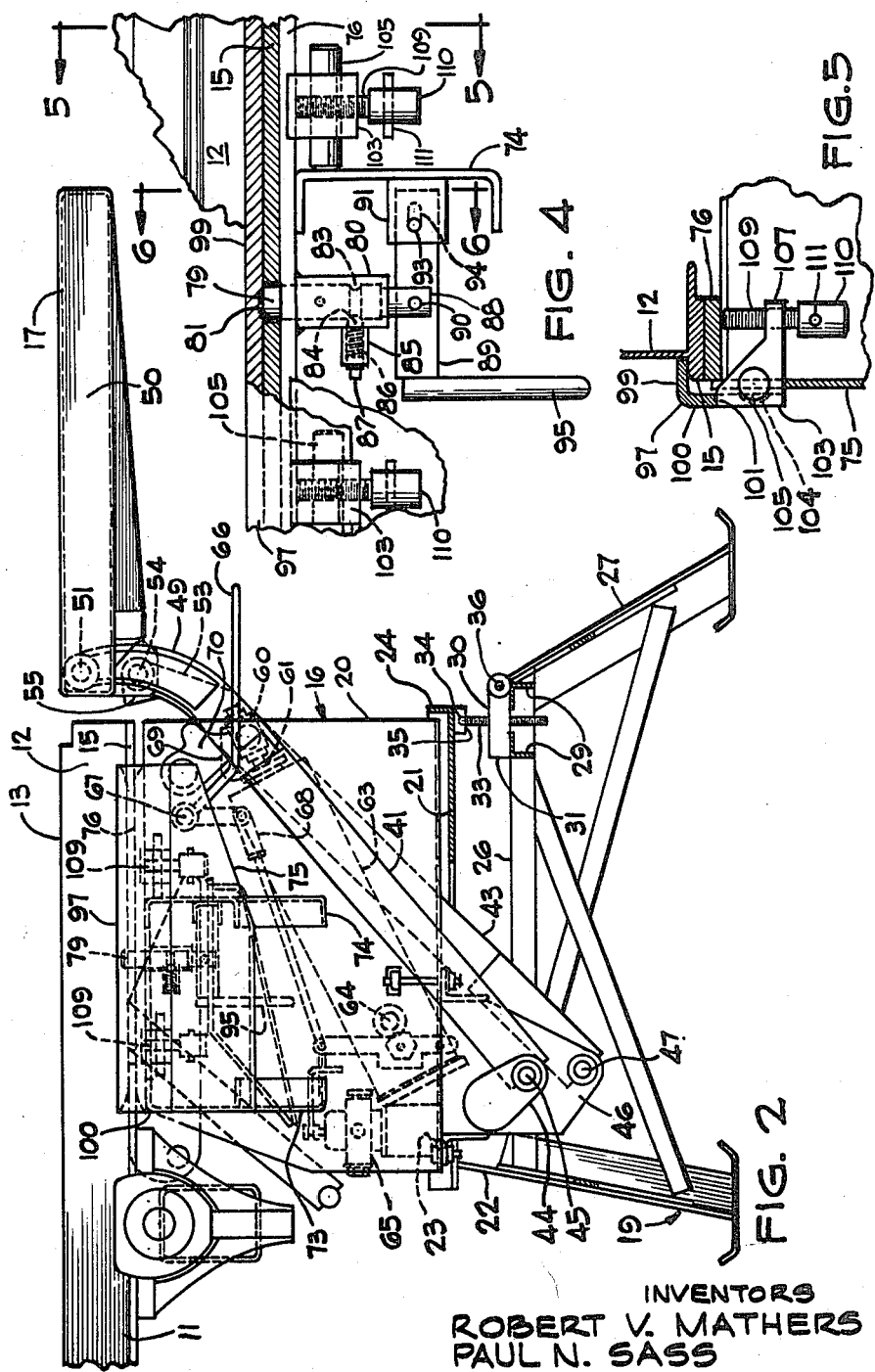
INVENTORS
ROBERT V. MATHERS
PAUL N. SASS
BY
ATTORNEYS

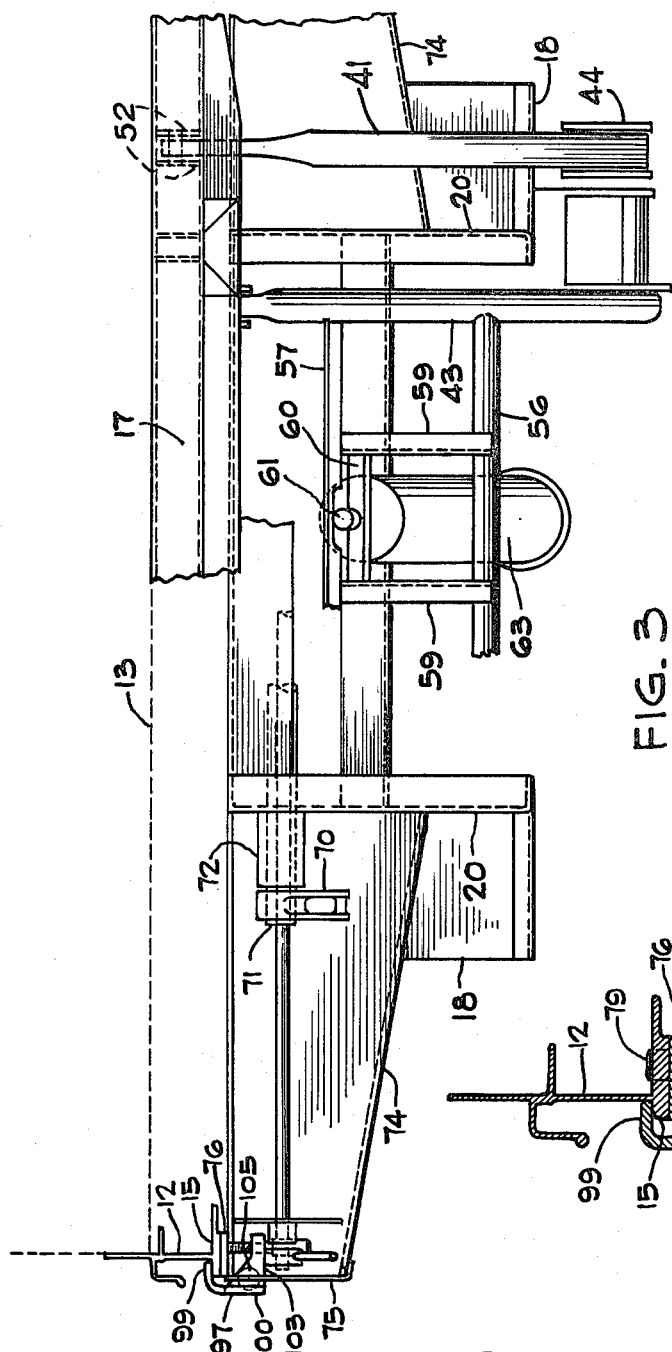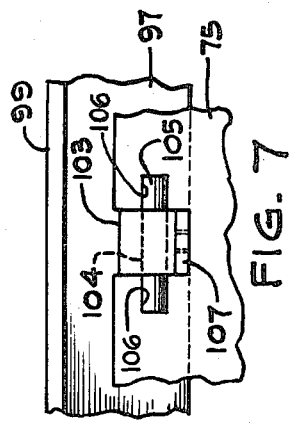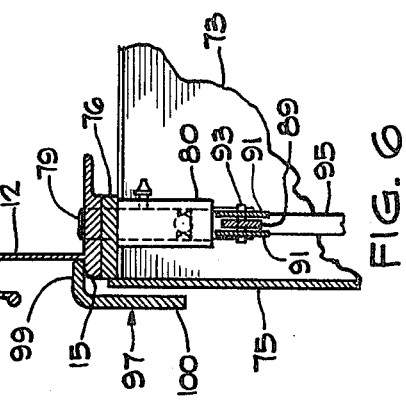

United States Patent Office 3,175,706
Patented Mar. 30, 1965

3,175,706
HYDRAULIC TAIL GATE
Robert V. Mathers and Paul N. Sass, Streator, Ill., assignors to Anthony Company, Streator, Ill., a corporation of Illinois
Filed Feb. 2, 1962, Ser. No. 170,727
9 Claims. (Cl. 214—77)

This invention relates to improvements in tail gates for vehicles and more particularly relates to a self-contained tail gate which may be left at a central station and be detachably mounted on a vehicle body for use in loading or unloading the vehicle.

A principal object of the present invention is to provide a self-contained tail gate for loading and unloading vehicles, in which the tail gate may readily be attached to or detached from a vehicle to be loaded or unloaded.

A further object of the invention is to provide a self-contained tail gate of the class described having improved means for detachably mounting the tail gate on a vehicle body, arranged with a view toward utmost simplicity and compactness in construction and operation.

Still another object of the invention is to provide a self-contained tail gate and supporting and storage means therefor, supporting the tail gate in position to be attached to a vehicle body and storing the tail gate in position to be attached to the vehicle body.

A still further object of the invention is to provide a support means for tail gates and the like, supporting the tail gate for attachment to or removal from a vehicle body, and leveling the tail gate to the level of a vehicle body for ready attachment thereto.

A still further object of the invention is to provide a simplified form of tail gate for detachable mounting to vehicle bodies having a novel form of clamping means to clamp the tail gate to the vehicle body in which the hinge pins for the clamping means take the entire load of the tail gate and the load thereon.

These and other objects of the invention will appear from time to time as the following specification proceeds and with reference to the accompanying drawings wherein:

FIGURE 2 is a view in side elevation of the rear end portion of the frame of the vehicle body, showing a tail gate clamped thereto and showing the tail gate in an elevated position at the level of the floor of the vehicle body;

FIGURE 3 is a fragmentary rear end view of the tail gate shown in FIGURE 1, with certain parts broken away and certain other parts removed;

FIGURE 4 is a fragmentary side view of the tail gate frame and vehicle body, with certain parts of the frame and body broken away and certain other parts shown in longitudinal section in order to show the shear and locating pin for locating the tail gate with respect to the vehicle body;

FIGURE 5 is a fragmentary transverse sectional view taken substantially along line 5—5 of FIGURE 4;

FIGURE 6 is a fragmentary sectional view taken substantially along line 6—6 of FIGURE 4; and FIGURE 7 is a detail view looking at a clamping plate and hinge from the inside thereof, with the clamp screw removed in order to show the mounting for one of the hinge pins suspending the tail gate from the vehicle body.

Figure 1:
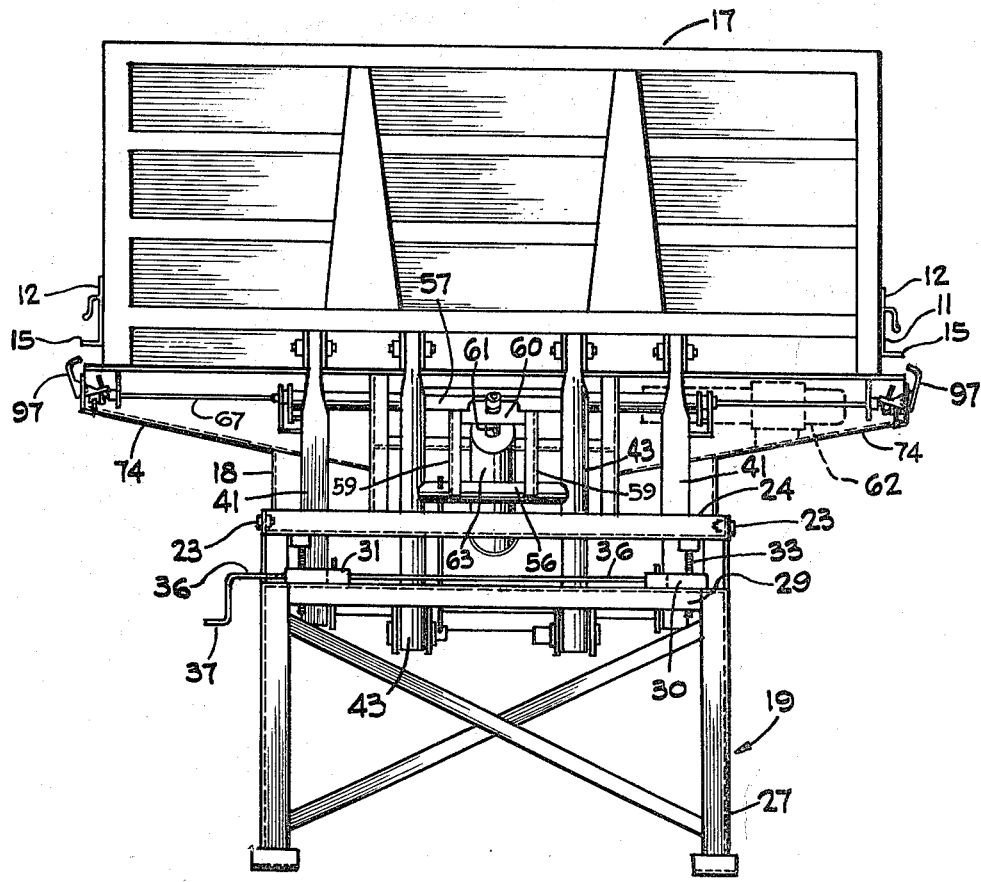
FIGURE 1 is a fragmentary view of the rear end portion of a vehicle body, showing a tail gate constructed in accordance with the invention, supported in position to be clamped to the vehicle body with the tail gate in a vertical inoperative position.

In the embodiment of the invention illustrated in the drawings, we have shown in FIGURES 1 and 2, the rear end portion of a vehicle body which may be the body of a trailer, a trailer unit of a tandem trailer, a truck and the like. The vehicle body includes a frame structure 11 having parallel spaced outer flanged beams 12 having a floor 13 supported therebetween in vertically spaced relation with respect to lower flanges 15 of the beams.

Detachably suspended from the flanges 15 of the beams 12 is a frame structure 16, supporting a tail gate platform 17 on outer and inner parallel links 41, 41 and 43, 43 respectively for vertical movement with respect to the ground to the level of the floor 13, in a plurality of parallel planes, and for movement into the upright inoperative position shown in FIGURE 1.

We have also shown a stand 19 engaged by and supporting inwardly spaced parallel side plates 20 of the frame structure 16 and supporting said frame structure and the tail gate platform 17 on the lower or bottom portions of the side plates 20, and on gusset plates 18 extending laterally outwardly from the forward end portions of the plates 20.

The stand 19 generally comprises an angularly adjustable open platform including a pair of parallel spaced longitudinally extending angles 21, pivotally supported adjacent their forward end portions on front upright legs 22 of the stand, on transverse pivot pins 23. The angles 21 are connected together at their rear ends to a transversely extending angle 24.

The stand 19 also includes an intermediate platform 26 connected to the legs 22 at its forward end and to rear legs 27 at the rear end thereof.

The intermediate platform 26 has spaced angles 29 extending thereacross adjacent the rear end portion thereof forming a support for housings 30 for laterally spaced screw jacks 31, having screws 33 extending upwardly therefrom. The screws 33 have rounded upper end portions 34 engageable within downwardly opening sockets 35 depending from the bottom of the horizontal leg of the angle 24.

The screw jacks 31 may be of well known forms in which a nut (not shown) has the screw 33 threaded therein, and a worm (not shown) on a worm shaft 36 meshes with a worm gear (not shown), which may have the nut formed integrally therewith. A handle 37 on one end of the shaft 36 is provided to operate the screw jacks and raise or lower the platform 21 about the transverse pivot pins 23 and thereby bring the longitudinally extending angles 21 of the platform to the level of the bottom surfaces of the flanges 15 of the longitudinally extending beams 12.

The angles 21 and 24 thus form a supporting platform for the frame structure 16, engaged by the rear end portions of the plates 20 of said frame and the gusset plates 18 extending laterally from the forward end portions of the plates 20, and providing an open frame structure accommodating the parallel links 41, 41 and 43, 43 and mounting brackets therefor, to extend downwardly beneath the top of said platform.

The tail gate platform 17 and supporting and elevating and lowering assembly therefor may be constructed on principles similar to the tail gate assembly shown and described in Patent No. 2,654,491 which issued to Glen A. Duis and Glen S. Park on October 6, 1953, so need only be described in sufficient detail herein to render my present invention readily understandable.

The supporting and elevating assembly for the tail gate platform 17 includes generally the outer arms 41, 41 pivotally supported at their inner ends between support brackets 44, 44 on pivot pins 45, 45. The brackets 44 are disposed beneath the plates 20 and are spaced laterally from said plates and are suitably suspended from the frame structure 16. The supporting and elevating and lowering assembly for the tail gate platform 17 also includes the inner arms 43, 43 supported between support brackets 46, 46 depending beneath the plates 20, 20 and pivotally mounted beneath said support brackets on pivot pins 47.

The arms 41, 41 have curved outer end portions 49, so formed as to extend generally parallel to the ground when the tail gate platform 17 is in a lowered position, and to extend in upright directions when the tail gate platform 17 is in the elevated position shown in FIGURE 2.

The curved end portions 49 extend within side frame member 50 of the tail gate platform 17 and are pivotally connected to the bottom of said tail gate platform on pivot pins 51 mounted at their ends in spaced ears 52 depending from the bottom of the tail gate platform.

The inner arms 43, 43, also have curved outer end portions 53, pivotally connected to the bottom of the tail gate platform 17 on pivot pins 54, connecting said curved end portions of said inner arms 43 between brackets 55, 55, depending from the load supporting portion of the tail gate platform 17, beneath the side frame members 50.

The inner arms 43 are extensible as shown in Patent No. 2,654,491, to accommodate the pivoting of the tail gate platform 17 to the upright position shown in FIGURE 1 by power, and are connected together intermediate their ends by a cross brace 56. The arms 43, 43 are also connected together adjacent their outer ends by a cross brace 57. Parallel spaced stiffening members 59 are connected between the cross brace 56 and the cross brace 57 and form a pivotal support for a cross head 60, to which is connected the outer or free end of a piston rod 61. The piston rod 61 is extensible from a cylinder 63 trunnioned between the plates 20, 20 on trunnion pins 64.

The source of supply of fluid under pressure to the cylinder 63 is a pump and motor unit 62 mounted on the frame structure 16 and drawing fluid from a suitable storage tank (not shown) mounted on said frame structure. The motor of the pump and motor unit 62 may receive its electrical energy from the electric system of the vehicle.

The admission of fluid under pressure to the head end of the cylinder 63 under the control of a valve 65, will thus extend the piston rod 61 with respect to the cylinder 63 and lower the tail gate platform 17 into engagement with the ground in a plurality of parallel planes. In a contrary manner, the admission of fluid under pressure to the piston rod end of the cylinder 63 under the control of the valve 65, will effect the elevation of the tail gate platform 17 to the level of the floor 13 in parallel relation with respect to the floor.

When the tail gate platform is in the position shown in FIGURE 2, and resting on latches 69 engaging keeper members 70, fluid under pressure may be supplied to the head end of the cylinder 63 to extend the inner links 43 and pivot the tail gate platform to the upright position shown in FIGURE 1 in the manner shown and described in Patent No. 2,654,491, so not herein shown or described further.

The valve 65 may be controlled by levers 66 at opposite sides of the frame structure 16 and mounted on a shaft 67 extending transversely of said frame structure. A link and leverage connection generally indicated by reference character 68 is provided between the shaft 67 and the valve 65, to operate said valve. The linkage and leverage connection may be of a conventional form and is no part of the present invention so need not herein be shown or described further.

The latching means for positively locking the tail gate platform at the level of the vehicle floor 13 generally comprises the latches 69 extending upwardly of the outer arms 41 and engageable with the pivoted keeper members 70 on opposite ends of a transverse shaft 71, journalled in spaced sleeves 72 projecting outwardly of the side plate 20. The pivoted keeper members 70 are biased in position to be engaged by the latches 69 and may be released under the control of the hand lever 66 in a suitable manner, not herein shown or described since it forms no part of the present invention. The latches and movable keepers operate on principles similar to those shown and described in Patent No. 2,654,491, and are no part of the present invention, so not herein shown or described further.

Referring now in particular to the frame structure 16 and the mechanism for connecting said frame structure to the side frame members 12 of the vehicle frame 11, the parallel spaced vertically extending side plates 20, are suitably connected together and have spaced front and rear facing channels 73 and 74 respectively, welded or otherwise secured to the outer sides thereof and extending laterally therefrom. The channels 73 and 74 are connected together at their outer ends by end plates 75, which are shown in FIGURE 2 as extending rearwardly beyond the channels 74 toward the tail gate platform 17.

Skid plates 76 bridge the channels 73 and 74 and extend along the upper inner sides of the end plates 75 for the length thereof, and are adapted to abut the undersides of the flanges 15 of the side frame members 12, and to be clamped into engagement with the undersides of said flanges.

A means is provided to locate the frame structure 16 with respect to the side frame members 12 of the vehicle, which is shown in FIGURES 2, 4 and 6 as comprising locating pins 79 guided for interengagement with the flanges 15 of the side frame members 12, inwardly of the vertical webs of said side frame members (FIGURES 4 and 6).

As shown in FIGURE 4, each locating pin 79 is slidably guided within a cylindrical guide 80 welded or otherwise secured to the underside of the skid plate 76 and depending therefrom. The locating pin 79 slidably extends through the skid plate 76 and is registrable with an opening 81 in the flange 15 of the side frame member 12. The locating pin 79 is shown as having an annular recess 83 extending thereabout, intermediate the ends thereof and registrable with a detent ball 84 movably mounted in the guide 80. A hollow boss 85 extends laterally of the guide 80 and has a hollow interior portion in alignment with the ball 84 and forms a casing for a spring 86 biasing the detent ball 84 to engage the recess 83. A pipe plug 87 closes the end of the hollow boss 85.

The locating pin 79 has a depending bifurcated portion 88, depending from the cylindrical guide 80. A lever 89 extends between the furcations of said bifurcated portion and is pivotally connected thereto, intermediate its ends on a pivot pin 90. One end of the lever 89 extends between two brackets 91 extending forwardly of the rear channel 74, and is slidably and pivotally connected to said brackets on a pivot pin 93, mounted at its ends in said brackets and extending through an elongated slot 94 formed in the lever 89.

The opposite end of the lever 89 has a handle 95 mounted thereon and depending therefrom, adapted to be gripped by the hand, to pivot said lever about the pivot pins 93 and move the locating pin 79 out of registry with the aperture 81, to permit the frame structure 16 and tail gate 17 to be removed from the vehicle.

The means for clamping the frame structure 16 and tail gate 17 to the spaced frame members 12 of the vehicle body comprises clamping plates 97, cooperating with the skid plates 76, to clamp the frame structure 16 to the flanges 15 of the frame members 12. The clamping plates 97 on each end of the frame structure 16 are the same and are mounted on said frame structure in a similar manner, so one clamping plate only need herein be described in detail.

Each clamping plate 97, as shown in FIGURES 2, 3 and 6, is in the form of an inverted L in cross-section and has a lip 99 adapted to be clamped into engagement with top surface of the flange 15 to bring the skid plate 76 into engagement with the bottom surface of said flange and to suspend the frame structure 16 from the flanges 15. The clamping plate 97 also has a depending leg 100 having parallel spaced vertically extending downwardly opening rectangular slots 101 therein, receiving hinge members 103, which may be welded or otherwise secured to said slots. The vertical leg 100 of the clamping plate 97 also has longitudinally recessed portions 104, extending in opposite directions from the slots 103 and in registry with and providing clearance for hinge pins 105 forming pivotal mountings for the hinges 103. The axes of hinge pins 105 extend along the center of the end plate 75 within longitudinal slots 106 in said end plate, and are welded or otherwise secured to said slots on opposite sides of the hinges 103. Each hinge 103 has an arm 107 extending inwardly of the end plate 75, having a clamp screw 109 threaded therein and adapted to engage the underside of the skid plate 76 and pivot the clamping plate 97 in a direction to bring the lip 99 of said clamping plate into clamping engagement with the flange 15, as the clamp screw 109 is tightened. The clamp screw 109 is shown in FIGURES 4 and 5 as having a depending cylindrical head 110 having a pin 111 extending diametrically therethrough and projecting from opposite sides thereof. The pin 111 is adapted to be engaged by a socket wrench (not shown) for turning the clamp screw 109 in a tightening or loosening direction, in an obvious manner.

It may be seen from the foregoing that the entire frame structure 16 and tail gate 17 are in effect suspended from the clamping plates 97 and that the major portion of the load is taken on the hinge pins 105, welded to the end plates 75, and that the location of the hinge pins 105 with respect to the line of engagement of the lips 99 with the flange 15 is such that very little load is transmitted through the clamp screw 109, to thereby increase the lift of the clamp screws 109, said screws serving only to bring the lips 99 into clamping engagement with the flanges 15 of the side frame members of the vehicle frame and to hold said lips into clamping engagement with said flanges.

When the tail gate platform 17 is not in use, it is stored on the stand 19, usually with the tail gate platform in its vertically extended position shown in FIGURE 1. As the vehicle is to be loaded or unloaded, the stand 19 with the tail gate platform thereon, is moved into alignment with the vehicle. The vehicle may then be backed along the stand, with the clamping plates 97 in their open positions shown in FIGURE 1 and the skid plates 76 in alignment with the flanges 15. Where the trailer has an adjustable suspension it is lowered on the tail gate after driving over the top of the tail gate. The associated clamping plates 97 and lips 99 thereof may then be brought into engagement with the flanges 15 and tightened to clamp the lips 99 into engagement with the flanges 15, by tightening the clamp screws 109.

When it is desired to remove the frame assembly 16 and tail gate platform 17 from the vehicle body, the tail gate platform 17 is first moved into its vertical position. The stand 19 is then moved into position beneath the plates 20, 20, or the trailer is backed over said stand and lowered to enable the plates 20, 20 to be supported on the angle 24 at their rear ends and to enable the gusset plates 18 extending laterally from the front ends of the plates 20, 20 to be supported on the horizontal legs of the angles 21. The clamping plates 97 may then be released from the respective flanges 15. The trailer may then be elevated and moved away from the frame structure 16 and stand 19.

It may be seen from the foregoing that a simplified form of self-contained tail gate platform has been provided, which is particularly adaptable to tandem types of tailers, making it possible to load and unload each unit of the tandem trailer by a hydraulic tail gate platform, and permitting the trailers to be moved away from the tail gate platforms when loaded or unloaded, and to then be coupled and drawn to their destination.

It may further be seen that a novel form of clamping means for suspending the frame assembly 16 and tail gate platform from the vehicle frame has been provided in which screw types of clamps form the suspending means for the frame structure and tail gate platform from the vehicle frame and in which most of the loads are transferred directly to the pivot pins for the clamps, which carry the major portion of the loads of the frame structure 16 and tail gate platform 17, relieving the clamping screws from most of the supporting or suspending loads.

While we have herein shown and described one form in which our invention may be embodied, it may readily be understood that various variations and modifications in the invention may be attained without departing from the spirit and scope of the novel concepts thereof, as defined by the claims appended hereto.

We claim as our invention:

1. A self-contained tail gate for vehicles and the like and in combination with a vehicle frame, said tail gate comprising
   (a) a frame structure,
   (b) a tail gate platform,
   (c) a parallel linkage arrangement connected between said frame structure and tail gate platform for supporting said tail gate platform for vertical movement in parallel relation with respect to the ground,
   (d) self-contained power means on said frame structure for actuating said linkage arrangement to vertically move said tail gate platform and to hold said tail gate platform in position,
   (e) and hinged clamping means on said frame structure taking the weight of said frame structure and tail gate platform and detachably mounting said frame structure to the vehicle frame, and accommodating ready removal thereof from the vehicle frame.

2. A self-contained vehicle tail gate and in combination with a vehicle frame having a pair of side frame members, said tail gate comprising
   (a) a frame structure,
   (b) a tail gate platform,
   (c) a parallel linkage arrangement connected between said frame structure and said tail gate platform for supporting said tail gate platform for vertical movement in parallel relation with respect to the ground,
   (d) self-contained power means on said frame structure for actuating said linkage arrangement and vertically moving said tail gate platform and holding said tail gate platform in position,
   (e) a removable stand supporting said frame structure and tail gate platform in position to be mounted on said side frame members,
   (f) and hinged clamping means on said frame structure taking the weight of said frame structure and tail gate platform and detachably securing said frame structure to the vehicle frame and accommodating ready removal of said frame structure from the vehicle frame, to be supported on said removable stand.

3. A self-contained vehicle tail gate and in combination with a vehicle frame having a pair of side frame members, said tail gate comprising
   (a) a frame structure,
   (b) a tail gate platform,
   (c) a parallel linkage arrangement connected between said frame structure and said tail gate platform for supporting said tail gate platform on said frame structure for vertical movement in parallel relation with respect to the ground,
   (d) self-contained power means on said frame structure and connected with said parallel linkage arrangement for actuating said linkage arrangement to vertically move said tail gate platform and to hold said tail gate platform in position, (e) a removable stand supporting said frame structure and tail gate platform in position to be assembled on said side frame members, (f) means adjusting the angle of said stand and frame structure to the plane of the vehicle frame, (g) and hinged clamping members on said frame structure adapted to take the weight of said frame structure and tail gate platform and extending along opposite sides of said frame structure for clamping said frame structure to the vehicle frame and accommodating ready removal of said frame structure from the vehicle frame to be supported on said stand.

4. A self-contained tail gate for vehicles and the like and in combination with a vehicle frame, said tail gate comprising (a) a frame structure, (b) a tail gate platform, (c) a parallel linkage arrangement connected between said frame structure and tail gate platform for supporting said tail gate platform for vertical movement in parallel relation with respect to the ground, (d) self-contained power means on said frame structure for actuating said linkage arrangement, to vertically move said tail gate platform and to hold said tail gate platform in position, (e) clamping means extending along opposite sides of said frame structure parallel to the sides of the vehicle frame and pivotally mounted on said frame structure to engage the vehicle frame and suspend said frame structure therefrom, (f) a movable stand supporting said frame structure and tail gate platform in position to be assembled on the vehicle frame, and means adjustably moving said stand to bring said frame structure into parallel relation with respect to plane of the bottom of the vehicle frame.

5. A self-contained tail gate for vehicles and the like and in combination with a vehicle frame, said tail gate comprising (a) a frame structure, (b) a tail gate platform, (c) a parallel linkage arrangement connected between said frame structure and tail gate platform for supporting said tail gate platform for vertical movement in parallel relation with respect to the ground, (d) self-contained power means on said frame structure for actuating said linkage arrangement to vertically move said tail gate platform and to hold said tail gate platform in position, (e) clamping plates extending along opposite sides of said frame structure, (f) pivot pins extending longitudinally of the vehicle frame, pivotally mounting said clamping plates to opposite sides of said frame structure, (g) said clamping plates having inwardly extending lips adapted to have clamping engagement with the vehicle frame in vertical planes closely adjacent said pivot pins whereby a major portion of the load of suspending said frame structure from the vehicle frame is taken on said pivot pins.

6. A self-contained tail gate for vehicles and the like and in combination with a vehicle frame, said tail gate comprising (a) a frame structure, (b) a tail gate platform, (c) a parallel linkage arrangement connected between said frame structure and tail gate platform for supporting said tail gate platform for vertical movement in parallel relation with respect to the ground, (d) self-contained power means on said frame structure for actuating said linkage arrangement to vertically move said tail gate platform and to hold said tail gate platform in position, (e) locating pins mounted adjacent opposite sides of said frame structure for vertical movement into interengagement with the vehicle frame for locating said frame structure with respect to the vehicle frame, (f) and clamping plates extending along opposite sides of said frame structure and pivotally mounted on said frame structure for pivotal movement about axes extending longitudinally of the vehicle frame, (g) said clamping plates having inwardly extending lips adapted to have clamping engagement with the vehicle frame and in planes closely adjacent the axes of pivotal movement of said clamping plates, (h) and clamping screws spaced inwardly of the axes of pivotal movement of said clamping plates for bringing said clamping lips into clamping engagement with the vehicle frame.

7. A self-contained tail gate for vehicles and the like and in combination with a vehicle frame having a pair of side frame members, said tail gate comprising (a) a frame structure, (b) a tail gate platform (c) a parallel linkage arrangement connected between said frame structure and tail gate platform for supporting said tail gate platform for vertical movement in parallel relation with respect to the ground, (d) self-contained power means on said frame structure for actuating said linkage arrangement to vertically move said tail gate platform and to hold said tail gate platform in position, (e) locating pins mounted adjacent opposite sides of said frame structure for vertical movement into interengagement with the vehicle frame for locating said frame structure with respect to the vehicle frame, (f) and clamping plates extending along opposite sides of said frame structure and pivotally mounted on said frame structure for pivotal movement about axes extending longitudinally of the vehicle frame, (g) said clamping plates having inwardly extending lips adapted to have clamping engagement with the vehicle frame in planes closely adjacent the pivotal axes of said clamping plates, (h) clamping screws spaced inwardly of the pivotal axes of said clamping plates for bringing said clamping lips into clamping engagement with the vehicle frame, (i) a movable stand supporting said frame structure and tail gate platform in position to be assembled to said side frame members, and means adjusting the plane of said stand to bring said frame structure into parallel relation with respect to the plane of the bottom of the vehicle frame.

8. In a self-contained vehicle tail gate (a) a supporting frame structure, (b) a tail gate platform spaced rearwardly of said frame structure, (c) a parallel linkage arrangement connected between said frame structure and tail gate platform for supporting said tail gate platform on said frame structure for vertical movement in parallel relation with respect to the ground, (d) self-contained power means on said frame structure for actuating said linkage arrangement to vertically move said tail gate platform in a plurality of parallel planes, (e) clamping plates extending along opposite sides of said frame structure and pivotally mounted thereon for movement about axes extending parallel to the sides of said frame structure, (f) screw means bringing said clamping plates into clamping engagement with the side frame members of a vehicle frame and releasing said clamping plates from said side frame members and (g) a mobile stand supporting said frame structure and tail gate in position to be clamped to the side frame members of the vehicle frame and receiving said frame structure when said clamping plates are released from the vehicle frame, (h) said stand having an adjustable supporting end portion angularly adjustable in a vertical direction, to bring said frame structure into parallel relation with respect to the bottom of the side frame members of a vehicle frame.

9. A self-contained tail gate for vehicles and the like and in combination with a vehicle frame having parallel spaced longitudinally extending flanged beams, said tail gate comprising (a) a frame structure having outer side walls, (b) a tail gate platform, (c) a parallel linkage arrangement connected between said frame structure and tail gate platform for supporting said tail gate platform for vertical movement in parallel relation with respect to the ground, (d) self-contained power means on said frame structure for actuating said linkage arrangement to vertically move said tail gate platform and to hold said tail gate platform in position, (e) clamping plates extending along said side walls in outwardly spaced relation with respect thereto, (f) said clamping plates having legs extending downwardly along said side walls and (g) lips extending horizontally from said legs over the tops of said side walls, (h) hinge pins pivotally mounting said clamping plates on said side walls, (i) the axes of said hinge pins intersecting said side walls, (j) clamp screws bringing said clamping plates and lips into clamping engagement with the flanges of said beams, (k) said lips being engageable with the flanges of the vehicle beams on the opposite sides of said side plates from said lips and on the same sides of said side plates as said clamping screws whereby a major portion of the loads supporting said frame structure and tail gate platform are taken directly on said hinge pins and relieved from said clamp screws.

References Cited by the Examiner

UNITED STATES PATENTS

| | | | |
|---|---|---|---|
| 1,303,854 | 5/19 | Clark | 214—515 |
| 1,835,133 | 12/31 | Bergen | 214—38.20 X |
| 1,948,600 | 2/34 | Templeton | 254—98 |
| 2,115,824 | 5/38 | McRorey | 254—98 |
| 2,172,244 | 9/39 | Grundler | 214—515 |
| 2,603,454 | 7/52 | Newton et al. | 214—77 X |
| 2,606,673 | 8/52 | Young | 214—38.22 |
| 2,624,477 | 1/53 | Messick | 214—77 |
| 2,654,491 | 10/53 | Duis et al. | 214—77 |
| 2,683,540 | 7/54 | Wood. | |
| 2,693,284 | 11/54 | Gerhardt | 214—38.22 |
| 2,779,488 | 1/57 | Trotter et al. | |
| 2,906,497 | 9/59 | Wolf. | |

HUGO O. SCHULZ, Primary Examiner.

GERALD M. FORLENZA, Examiner.